Oct. 17, 1961 J. C. COLEMAN ET AL 3,005,122
CATHODE RAY TUBE ENVELOPE
Filed Sept. 23, 1959 3 Sheets-Sheet 1

INVENTORS
J. C. COLEMAN
R. W. MAYHEW
BY
W. A. Schaich &
E. J. Holler
ATTORNEYS

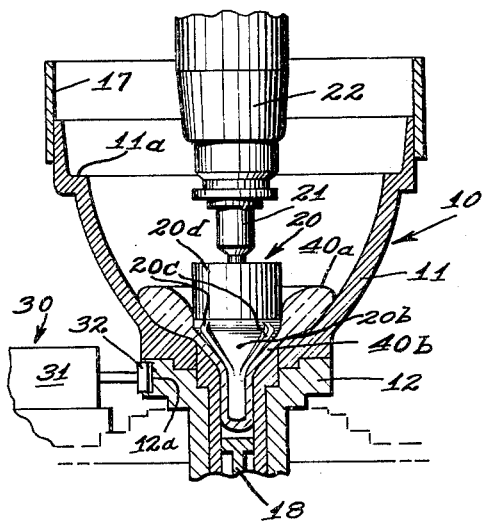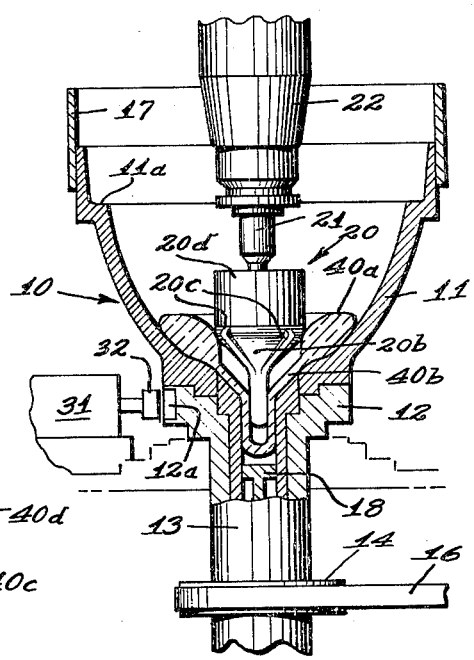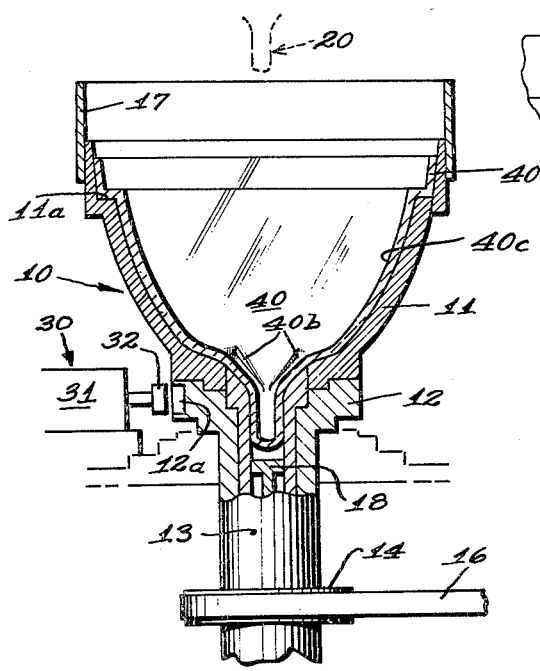
INVENTORS
J.C. COLEMAN
R.W. MAYHEW
ATTORNEYS

Oct. 17, 1961     J. C. COLEMAN ET AL     3,005,122
CATHODE RAY TUBE ENVELOPE
Filed Sept. 23, 1959                                3 Sheets-Sheet 3

INVENTORS
J. C. COLEMAN
R. W. MAYHEW
BY
*W. A. Schaich*
*E. J. Holler*
ATTORNEYS … # 3,005,122
CATHODE RAY TUBE ENVELOPE
James C. Coleman and Ray W. Mayhew, Columbus, Ohio, assignors, by mesne assignments, to Owens-Illinois Glass Company, Toledo, Ohio, a corporation of Ohio
Filed Sept. 23, 1959, Ser. No. 841,730
5 Claims. (Cl. 313—64)

This invention relates to the manufacture of hollow articles by centrifugal molding action and more specifically to molding bowls or similar articles from molten glass or other molten or plastic material. The invention as herein illustrated and described is especially adapted to the manufacture of hollow glass funnels or body members for cathode-ray picture tube envelopes for television reception.

As presently manufactured, cathode-ray tube envelopes or bulbs are made by separately fabricating a glass face plate and a hollow glass funnel. These parts are subsequently sealed together as by thermal fusion or other means. More recently, the hollow funnel has been made by centrifugal action wherein a charge of molten glass is deposited in the apex of a hollow upwardly-facing mold and the mold is immediately rotated about its vertical axis to form the hollow funnel. A short tubular portion is usually formed integral with the hollow funnel at the apex of the mold which portion is subsequently severed and replaced by a longer tubular neck member. The above steps are followed in making both circular and rectangular cathode-ray bulbs.

Previously, the small or apex end of all commercially-produced funnel members has been formed having a circular cross-sectional configuration. This has been true whether the screen area of the bulb has been circular or rectangular in peripheral contour. Normally a circular electrical yoke element adapted to create an electromagnetic field to effect proper beam deflection is mounted in close proximity to the juncture area of the funnel and its neck tubulation. Precise control over the contour and dimensions of glass sidewalls in this region is imperative for satisfactory clearance and control of the cathode-ray beam which scans the tube screen. Where the deflected beam is surrounded by sidewalls which are circular in cross-section, the raster which is scanned being rectangular in shape must be given proper clearance to prevent the formation of shadows at corners of the tube screen. This condition may occur when the deflected beam at the diagonals of its rectangular pattern is interrupted or distorted by the sidewalls.

Concurrently with providing proper beam clearance in bulbs by precise formation of the frusto-conical small end of the funnel, problems of excessive weight and undue length of the bulb as measured axially between its extremities have arisen. The normally cylindrical yoke area has recently been manufactured flaring at increasingly wider angles of divergence of electron beam deflection commensurate with practical tube design. The industry has proceeded from beam deflection angles increasing from 70° to 90° and then to 110° to overcome problems of excessive bulb weight and over-all length. The latter beam angle is utilized in so-called wide-angle bulbs.

Previously, in the manufacture of funnel parts for television picture tube envelopes, the prior art has followed the teaching of Giffen Patent No. 2,662,346, issued December 15, 1953, entitled "Method and Apparatus for Forming Glass." This disclosure teaches the method of introducing a charge of molten glass into an upwardly facing mold which is then rotated to distribute centrifugally the major portion of the glass charge over the wall of the mold while advancing a cylindrically-shaped tool downwardly into the tubular apex portion of the mold to contact and shape the glass therein. The distributing tools as disclosed by Giffen in the above-identified patent and in Patent No. 2,696,699, issued December 14, 1954, entitled "Glass Forming," all relate to shaping the vortex end of the funnel simultaneously with mold rotation to form circular or cylindrical areas thereat having a prescribed wall thickness. Tube envelope structures fabricated in accordance with these teachings have not provided an efficient use of beam deflection power because the yoke sidewall area is circular and the raster of the beam paths in the yoke region is rectangular.

Accordingly, it is an object of the present invention to provide a cathode-ray tube envelope having a structure which permits more efficient use of electron beam deflection power.

Another object of the present invention is to provide a cathode-ray tube structure and method of fabricating its body portion which permit effective control of electron beam deflection by improved distribution of the glass or material being molded in the deflection area and to overcome various difficulties met within conventional structures and methods.

Another object of the present invention is to provide a cathode-ray television picture tube having a funnel member which is non-circular at both its large and small ends for improved electron beam scanning of a screen or target area.

Another object of the invention is to provide a body member of a cathode-ray tube envelope having an essentially rectangular contour at its large end and having a non-circular contour over at least the interior surfaces of its small end in the same orientation as the large end.

Another object of this invention is to provide an improved method of forming a generally conical-shaped hollow glass article such as a television picture tube funnel by combinedly press-forming a localized sidewall region of the article into non-circular cross-sectional contour over at least its convexly-shaped inner surfaces and centrifugally casting the remaining extensively-flaring sidewall portions thereof.

A still further object of the present invention is to provide a method of forming a funnel member of a cathode-ray picture tube envelope of thermoplastic material which envelope is rectangular and geometrically similar at both its large and small ends by stepwise pressing its small end into rigid form with a rectangular pattern of radially-extending depressions and subsequently centrifugally casting the remaining portion of said funnel member in a rotatable mold.

The specific nature of this invention, as well as other objects and advantages thereof, will become apparent to those skilled in the art from the following detailed description taken in conjunction with the annexed sheets of drawings on which, by way of preferred example only, are illustrated the preferred embodiments of this invention.

On the accompanying drawings:

FIG. 3 is a partial vertical sectional view showing the press-forming apparatus in cooperative arrangement with the rotatable mold in stationary relation during the pressing step.

FIG. 3A is a view similar to FIG. 3 showing the pressing apparatus partially withdrawn from its molding arrangement.

FIG. 4 is a view similar to FIG. 3 showing the mold and molded article after rotation with the pressing apparatus fully withdrawn.

Figure 2:
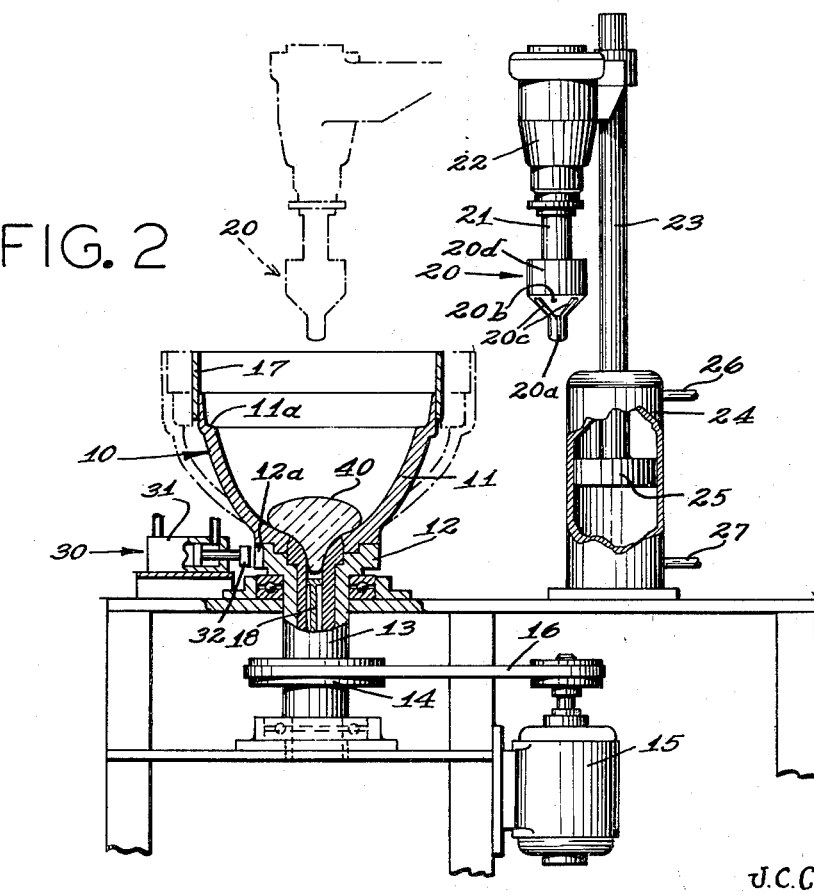
FIG. 2 is a part-sectional elevational view of a rotatable mold and cooperative press-forming apparatus for forming such funnel member, the mold being shown in initially charged arrangement.

As shown in FIG. 2, a mold 10, formed with a hollow body 11 and a short tubular stem or extension 12, is mounted on a vertical rotary shaft 13 for rotation therewith about its vertical axis. Shaft 13 is retained on bearings and has a pulley 14 mounted thereon which may be driven by a motor 15 and an endless belt 16 or other source of power. The lower end of the mold is closed by an ejector valve 18 vertically operable within extension 12.

A pressing tool 20 is mounted adjacent to mold 10 for movement into and out of the mold cavity as described hereinbelow. Tool 20 is mounted on a rigid shaft 21 which is in turn supported by a rock arm 22. Rock arm 22 is mounted for both lateral movement in a horizontal direction and vertical reciprocating movement into and out of the mold cavity to move the tool 20 into and out of pressing relation. Arm 22 is actuated by linkage to a reciprocating piston rod 23 which may be powered either mechanically or pneumatically. The downward movement of arm 22 may be limited by an adjustable stop (not shown) which may be threadedly mounted on a journaled shaft. Piston 25 is reciprocatingly moved within cylinder 24 to its prescribed upper and lower levels by pneumatic fluid introduced into cylinder 24 through inlet and outlet lines 26 and 27 and piston rod 23 is moved vertically thereby.

Rock arm 22 may be moved laterally by a cam follower riding in a groove as shown in Patent No. 2,861,394 to Ruff, entitled "Forming Glass Articles," issued November 25, 1958. Another form of pressing apparatus for use in conjunction with a rotary mold is disclosed in the copending patent application of Clark, Serial No. 568,865, filed March 1, 1956, and entitled "Machine for Centrifugal Molding of Glassware," now abandoned, this application being assigned to the same parent assignee as the present application. Both of the aforementioned disclosures relate to distributor tool mechanisms which have frusto-conical surfaces and which are rotatable in conjunction with the rotary mold. This invention however utilizes a stationary pressing tool which is maintained in prescribed relation devoid of angular movement during the interval of its lowermost pressing alignment with the mold.

The lateral displacement of arm 22 away from the mold 10 permits the introduction of a charge of molten glass into the mold. As shown in FIG. 2, a gob 40 of molten glass has been deposited in mold 10 and pressing tool 20 is shown in broken lines in its extended position immediately thereover for initiating a pressing operation.

Pressing tool 20 comprises a short cylindrical section 20a integral with and merging into a generally frusto-ionical section 20b generally similar to the shape of the apex of the funnel. The frusto-conical surfaces 20b have a series of radially projecting protuberances or lugs 20c adapted to shape the central upper surfaces of the glass charge during pressing with an upwardly facing peripherally-spaced rectangular pattern of radial grooves or depressions. Tool 20 has essentially right-cylindrical surfaces 20d above frusto-conical surfaces 20b adapted to serve a distributing function upon an upper portion of the glass charge. Tool 20 is maintained in stationary fixed relation on shaft 21 for the pressing operation in conjunction with the mold.

The large open end of mold body 11 is generally rectangular in shape having a ledge portion 11a which is surrounded by an annular ring 17. Ledge 11a of the mold body and retaining ring 17 serve to restrain the uppermost portion of the glass during centrifugal spinning to form an integral moil and prevent accidental discharge of the charge from the mold during rotation.

An upper portion of mold extension 12 has a recess 12a formed in an external region to facilitate the engagement of a locking device 30 to index the mold into proper pressing orientation with pressing tool 20. Indexing device 30 consists of an air cylinder motor 31 with an indexing lug 32 adapted to project into recess 12a for proper axial orientation of the mold and pressing tool. Thus, positive angular alignment between the mold 10 and pressing tool 20 is obtained. Where the large open end of mold 11 is rectangular in shape in symmetry with its vertical axis, the lower region of mold may have a pair of recesses 12a in oppositely aligned arrangement for indexing the mold in either one of two positions.

According to the present method, a charge 40 of molten glass is deposited in hollow mold 10 while the mold is stationary or rotating at a very slow rate (FIG. 2). A short interval of time is allotted in order to permit the charge to settle into the apex of the mold and to index the mold 10 and pressing tool 20 into proper alignment. Alternately, the mold may be indexed prior to being charged and before bringing the pressing tool into vertical alignment.

The prescribed alignment consists of the diagonals at the large rectangular end of the mold being co-radial with the radially extending protuberances 20c on the frusto-conical surfaces of the pressing tool. With the mold and pressing tool in proper alignment both axially and angularly, the tool is moved downwardly by cylinder 24 to press-form a localized central region of the glass charge 40 into non-circular form as shown in FIG. 3. The cylindrical portion 20a of the pressing tool penetrates the lower apex area and cylindrical portion of the mold body 11 and mold extension 12 in vertical alignment therewith. The mold surfaces at this area may be either cylindrical or rectangular in horizontal cross-section being indicated as the former in the drawings. Pressing tool 20 has a properly contoured upper region 20d illustrated as essentially right-cylindrical to distribute properly the unpressed upper portion 40a of the glass charge which remains fluid and workable for a short interval for subsequent spinning.

Immediately following the formation of the central localized portion 40b of the glass charge in the apex area of the mold, pressing tool 20 is substantially withdrawn from contact with the glass by operation of the air cylinder motor and upward travel of piston rod 23. The glass portion 40b which has been pressed thin is cooled or chilled by the combined action of the tool and mold to establish an initially set-up condition while the upper remaining portion 40a of the charge of greater mass is still at a low viscosity. After partial withdrawal of the tool 20 as shown in FIG. 3A, locking lug 32 is withdrawn from contact with the mold recess 12a and the mold is immediately rotated rapidly about its vertical axis in order to distribute the remaining glass 40a along the sides of the mold by centrifugal action. The mold is rotated at sufficient angular velocity over a sufficient interval of time to spread and mold the remaining glass over the flaring sidewalls of the mold. Depending upon the character of the particular heat-softened material being molded, retraction of the tool 20 in an upward direction after pressing can also be controlled to leave some of the upper charge portion 40a in contact with the upper cylindrical surfaces 20d of the tool 20 at least partially during the accelerating period of the mold to prevent the charge from slumping interiorly into the pressed region. Tool surfaces 20d can also be contoured having a non-cylindrical shape to distribute the upper charge portion to be formed in a rectangular pattern solely by centrifgual forces.

After forming the full flaring sidewalls 40c of the article by rotation, the mold is decelerated and stopped and the molded article is cooled and hardened into final form. As shown in FIG. 4, the glass has been moved upwardly over the full sidewall surfaces of mold body 11 and over its ledge portion 11a, the glass thereabove comprising an integral moil portion of the final article which may be subsequently separated. During rotation, the press-formed non-circular apex area of the molded article remains unaffected having been chilled to such a degree by the thinning action of the mold and tool that centrifugal force does not adversely affect the non-circular configuration of the glass in this region on spinning. By this prior pressing of the yoke area of the tube funnel in non-circular form, the required control of beam clearance in the final article is obtained.

Figure 1:
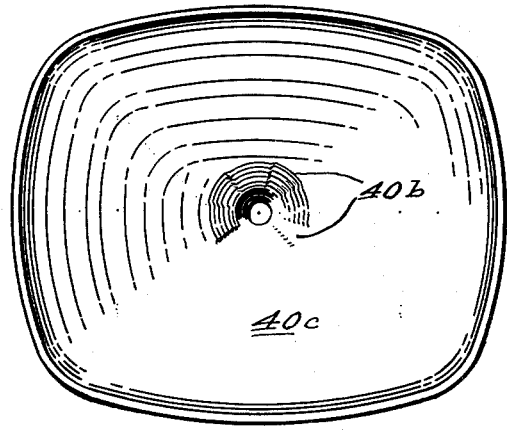
FIG. 1 is a plan view of an essentially rectangular funnel member of a cathode-ray tube envelope having non-circular interior surfaces at its small end molded in accordance with the present invention.
Figure 5:
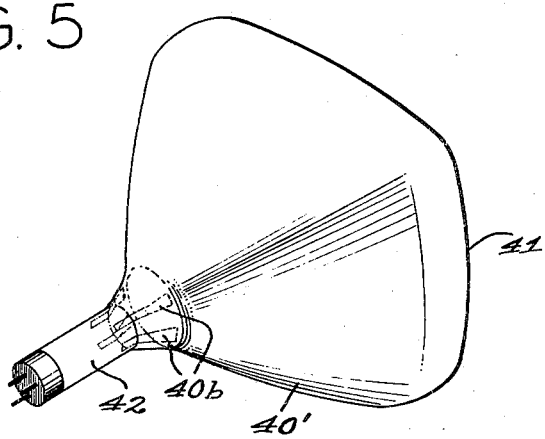
FIG. 5 is a perspective view of a cathode-ray tube showing its small end region having a non-circular contour.

The excess glass from the pressing is either forced downwardly into mold extension 12 to form the tubular or "nubbin" portion of the article or upwardly away from the frusto-conical surfaces of the tool. The lower short tubular portion of the article may be subsequently separated therefrom and a longer length of neck tubulation joined thereto in subsequent operations. As illustrated in FIGS. 1 and 5 newly-formed rectangular funnel member 40' is shown having a rectangular pattern of radial grooves 40b formed in the same orientation as the diagonals of its large rectangular open end.

Following formation of the funnel 40' the large open end thereof may be scored internally while the article is still retained within the mold as the mold slowly rotates. After this scouring operation, the ejector valve 18 in the bottom of the mold is moved upwardly to separate the molded article from the mold sidewalls. The funnel is then retained in a convenient position for being removed from the mold. After removal of the funnel from the mold, the moil or rim portion 40d of the funnel formed above the mold ledge 11a may be removed in any conventional manner as by annularly cracking it off by a differential chilling of the glass above and below the score line.

Figure 6:
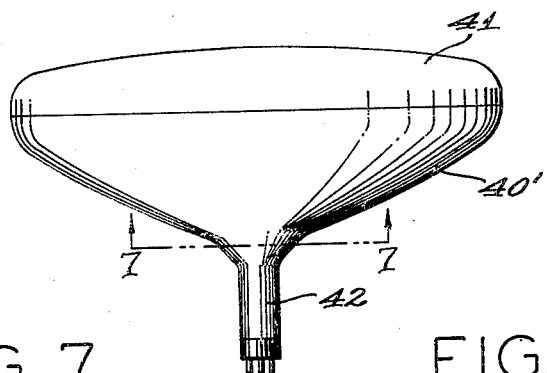
FIG. 6 is a side elevational view of such tube.
Figure 7:
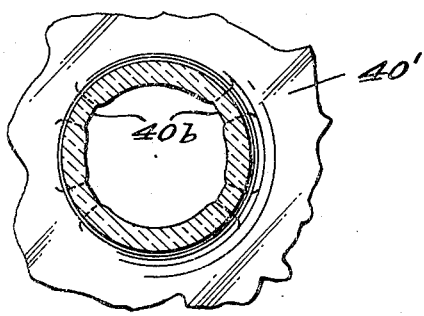
FIG. 7 is a horizontal sectional view of the tube yoke portion taken along the line 7—7 of FIG. 6.

A completed so-called rectangular tube is shown in FIG. 5 wherein the body part consists of a funnel 40' molded in accordance with the foregoing procedure. The large open end of the funnel has a rectangular face plate 41 sealed to its large rectangular open end and a neck tubulation 42 sealed to its small end. FIG. 6 shows a completed tube of the wide-angle type in which the funnel 40' has been fabricated by the above procedure. The apex area of the funnel member adjacent its neck tubulation 42 has a cross-sectional shape which is cylindrical on its external surfaces and has a rectangular pattern of radial recesses 40b on its inner surfaces as shown in FIG. 7. This form of yoke area permits deflection of the electron beam in an essentially rectangular scanning pattern for bombarding the rectangular tube screen. Thus, the deflected beam is provided wih proper clearance as scanned in a rectangular pattern to facilitate reducing the overall length of the bulb. Also the surrounding deflecting yoke can be brought into closer proximity to the beam deflection point. A conventional electrical yoke element having a circular opening can be used to surround this area of the envelope for improved utilization of beam deflection power. The depth and width ratio of recesses 40b are in no way critical so far as the tube strength is concerned so long as the glass thickness is maintained sufficiently great to prevent undue strain and electrical breakthrough along with proper control of beam deflection.

Figure 8:
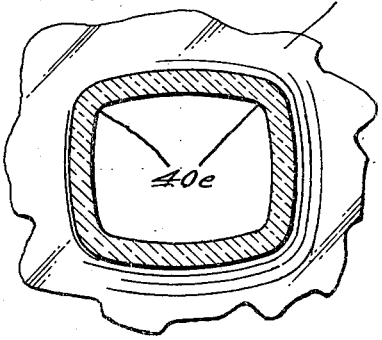
FIG. 8 is a view similar to FIG. 7 showing a modification of the tube yoke area.

A modified form of the yoke area as shown in FIG. 8 may be formed wherein the mold apex area has a modified rectangular shape geometrically similar, or nearly so, as dictated by the configuration of the beam path in that region, and in the same orientation as the large open end of the funnel. The corner regions 40e of the rectangularly-shaped small end are smoothly curved in order for the envelope to withstand the forces of atmospheric pressure loading and to prevent the development of strains thereat. Pressing tool 20 rather than having radial protuberances as such as described hereinabove, has a modified rectangular shape geometrically similar to the mold apex area. Mold extension 12 also has a similar rectangular cross-sectional shape. The cooperative interaction of these parts on pressing creates a yoke area having a substantially uniform wall thickness and a precise rectangular contour which is optimum to contain the envelope of electron beam paths. Where the external surfaces of the funnel yoke area are rectangular in shape, an electrical yoke element having a rectangular opening is utilized in conjunction therewith.

The foregoing description sets forth a tube configuration and method of fabricating its primary body portion by a completely unique procedure for molding thermoplastic material. A tube envelope fabricated of a thermoplastic material such as glass having a neck region of rectangular or non-circular cross-section has been considered not only difficult to manufacture as a unitary article but unattainable in large-size centrifugally cast workpieces. This is particularly true in forming the areas of such articles where the moment of inertia is relatively low as at the small end of a hollow funnel adjacent its axis of rotation.

The subject envelope having a non-circular contour over at least the inner surfaces of the yoke region does not produce an accumulation of static charges in the corners of the neck when the surrounding electromagnetic field is established. Further, the subject contour does not result in loss of electrical energy or non-linear distortions of the electron beam.

The new method of fabricating a funnel-shaped main body portion of the subject tube envelope described above is claimed in subsequently-filed application, Serial No. 19,883, filed April 4, 1960, in our names as a division of the instant application.

Various modifications of the present invention may be resorted to within the spirit and scope of the appended claims.

We claim:

1. A cathode-ray tube component comprising a substantially funnel-shaped rigid envelope having flaring sidewalls extending between its large and small ends, said envelope having its larger end shaped to a substantially rectangular configuration, a neck tubulation projecting from said smaller end, thereby defining a peripheral convexly-shaped junction area between said sidewalls and said neck tubulation, the inner surface of the junction area having a basic circular shape modified by a series of four spaced-apart indentations each having an appreciable arcuate and axial extent.

2. A television picture tube envelope comprising a substantially funnel-shaped rigid body, said body having flaring side walls extending between its ends, said body having an essentially rectangular screen portion secured to its larger end and having a neck tubulation projecting from its smaller end, thereby defining a peripherally extending, convexly-shaped internal junction surface between said sidewalls and said neck tubulation, said junction surface having a basically circular cross-sectional configuration and four peripherally-spaced depressions therein modifying the cross-sectional configuration of the internal surface, each of said depressions being of an appreciable peripheral extent and each being oriented about the envelope longitudinal axis in alignment with a corner portion of said rectangular screen portion of said body, respectively.

3. In a television picture tube envelope, an all-glass unitary funnel component comprising side walls flaring at an included angle of greater than 90° to a rectangular open-end and joined to a substantially smaller neck tubulation through an apex area of appreciable wall thickness, said apex area being modified from a circular configuration at its inner surface by a plurality of truncated sector-shaped indentations in said inner surface, each of said indentations radiating from the axis of the tubulation toward one of the corners of the rectangular open end, respectively.

4. In a television picture tube envelope for use with a face plate of substantially rectangular configuration, the envelope including an all-glass funnel having a rectangular open end for abutting the face plate, said open-end having rounded corners, a neck of circular configuration substantially smaller than the open end, and side walls converging from the open end of the funnel to the neck, the improvement of a neck-to-side wall transition portion essentially circular in cross-section but having a plurality of spaced-apart indentations formed at the inner surface only thereof, each of said indentations being aligned with the axis of the neck and a rounded corner of the rectangular open end of the funnel, and the indentations, in combination with the arcuate segments of the inner surface of said transition portion between said indentations, presenting a non-circular inner opening of increased cross-sectional area and of increased neck axis-to-rectangular open end clearance.

5. A television picture tube envelope including an all-glass unitary funnel component having side walls flaring at an included angle of greater than 90° and joining a substantially rectangular relatively large open end having corners to a substantially smaller neck end, characterized by an integral transition portion intermediate the neck end and the flaring side walls, said transition portion comprising walls having concave outer surfaces and convex inner surfaces smoothly blending the flaring side walls in to the neck end, said transition area walls cooperatively defining an interior surface which is basically circular in cross-sectional configuration and which is modified by four indentations arranged in a rectangular pattern to yield a beam clearance opening at the transition portion located on a common axis with said large open end, and which is oriented about the axis to align the indentations, respectively, with the corners of the large open end of the funnel component.

References Cited in the file of this patent

UNITED STATES PATENTS

| | | |
|---|---|---|
| 2,401,278 | Szegho | May 28, 1946 |
| 2,572,511 | Palmquist | Oct. 23, 1951 |
| 2,591,521 | De Gier | Apr. 1, 1952 |
| 2,596,990 | Doyle | May 20, 1952 |
| 2,836,751 | Turnbull | May 27, 1958 |
| 2,907,906 | Swedlund | Oct. 6, 1959 |

FOREIGN PATENTS

| | | |
|---|---|---|
| 525,181 | Great Britain | Aug. 22, 1940 |
| 867,824 | France | Nov. 29, 1941 |
| 113,121 | Sweden | Feb. 6, 1945 |
| 1,024,489 | France | Apr. 1, 1953 |
| 521,316 | Canada | Jan. 31, 1956 |
| 820,181 | Great Britain | Sept. 16, 1959 |